(12) United States Patent
Turvey et al.

(10) Patent No.: US 11,666,043 B2
(45) Date of Patent: Jun. 6, 2023

(54) APPARATUS AND METHOD FOR RELEASABLE FISHING LURE ATTRACTOR BLADE

(71) Applicants: Chris Turvey, Yakima, WA (US); Scott Kaul, Longview, WA (US)

(72) Inventors: Chris Turvey, Yakima, WA (US); Scott Kaul, Longview, WA (US)

(*) Notice: Subject to any disclaimer, the term of this patent is extended or adjusted under 35 U.S.C. 154(b) by 88 days.

(21) Appl. No.: 17/187,371

(22) Filed: Feb. 26, 2021

(65) Prior Publication Data
US 2021/0267182 A1    Sep. 2, 2021

Related U.S. Application Data

(60) Provisional application No. 62/982,594, filed on Feb. 27, 2020.

(51) Int. Cl.
*A01K 91/04*   (2006.01)
*A01K 85/14*   (2006.01)
*A01K 85/12*   (2006.01)

(52) U.S. Cl.
CPC .............. *A01K 91/04* (2013.01); *A01K 85/12* (2013.01); *A01K 85/14* (2013.01)

(58) Field of Classification Search
CPC ........ A01K 85/12; A01K 85/14; A01K 91/00; A01K 91/08; A01K 91/04; A01K 85/02
USPC ............ 43/42.49, 42.36, 42.05, 42.22, 43.13
See application file for complete search history.

(56) References Cited

U.S. PATENT DOCUMENTS

| | | | | | |
|---|---|---|---|---|---|
| 1,530,343 | A | * | 3/1925 | Bayer | A01K 85/12 43/42.16 |
| 1,682,711 | A | * | 8/1928 | Pflueger | A01K 85/14 43/42.04 |
| 2,088,669 | A | * | 8/1937 | Shutter | A01K 85/14 43/42.52 |
| 2,117,322 | A | * | 5/1938 | Hillman | A01K 91/00 43/42.72 |
| 2,470,861 | A | * | 5/1949 | Prentice | A01K 85/02 43/42.36 |
| 2,503,607 | A | * | 4/1950 | Arff | A01K 85/14 43/42.34 |
| 2,512,914 | A | * | 6/1950 | Boice | A01K 85/14 43/42.34 |
| 2,603,024 | A | * | 7/1952 | Pollard | A01K 85/14 43/42.19 |
| 2,706,868 | A | * | 4/1955 | Homer | A01K 85/14 43/42.52 |

(Continued)

*Primary Examiner* — Timothy D Collins
*Assistant Examiner* — Maria E Graber

(57) ABSTRACT

A releasable attractor blade system is provided. One embodiment has an attractor blade defined by an aperture proximate to an edge of a leading blade portion, defined by a release slot proximate to an edge of a trailing blade portion of the attractor blade. A release system has a retainer at the first end of a cord that passes through the aperture and is configured to be frictionally retained outside of the aperture; a release hook at the second end of the cord that is inserted into the release slot of the attractor blade to releasably secure the releasable attractor blade system to the attractor blade release system; and an elastic portion secured between the first and second cord ends, wherein the release system holds the attractor blade in position along a longitudinal axis of the attractor blade during trolling so that the attractor blade attracts game fish.

19 Claims, 7 Drawing Sheets

(56) References Cited

U.S. PATENT DOCUMENTS

| | | | | |
|---|---|---|---|---|
| 2,716,832 A * | 9/1955 | Minnie, III | A01K 95/00 | 43/43.12 |
| 2,750,701 A * | 6/1956 | Beames | A01K 85/16 | 43/42.47 |
| 2,909,863 A * | 10/1959 | Rector | A01K 85/01 | 43/42.49 |
| 2,932,115 A * | 4/1960 | Dunn | A01K 91/08 | 43/43.12 |
| 3,015,904 A * | 1/1962 | Trani | A01K 85/14 | 43/42.32 |
| 3,122,853 A * | 3/1964 | Koonz | A01K 85/14 | 428/30 |
| 3,341,966 A * | 9/1967 | Pippen | A01K 95/00 | 43/43.15 |
| 3,656,253 A * | 4/1972 | Gaunt | A01K 91/065 | 43/42.34 |
| 3,693,275 A * | 9/1972 | Craig | A01K 85/00 | 43/42.35 |
| 3,874,109 A * | 4/1975 | Peterson | A01K 85/14 | 43/42.22 |
| 3,897,648 A * | 8/1975 | Neary | A01K 91/08 | 43/43.12 |
| 4,122,624 A * | 10/1978 | Smith | A01K 85/14 | 43/42.5 |
| 4,129,956 A * | 12/1978 | Neary | A01K 91/08 | 43/43.13 |
| 4,201,006 A * | 5/1980 | Wetherald | A01K 85/00 | 43/42.51 |
| 4,202,127 A * | 5/1980 | Marek | A01K 85/14 | 43/42.31 |
| 4,486,970 A * | 12/1984 | Larson | A01K 91/08 | 43/43.13 |
| 4,794,722 A * | 1/1989 | Crevoisier | A01K 91/06 | 43/42.72 |
| 4,905,401 A * | 3/1990 | Fukumoto | A01K 91/08 | 43/43.12 |
| 5,113,608 A * | 5/1992 | Hook | A01K 91/04 | 43/42.49 |
| 6,050,018 A * | 4/2000 | Allen | A01K 97/04 | 43/4.5 |
| 6,279,260 B1 * | 8/2001 | Farr | A01K 91/06 | 43/43.12 |
| D451,574 S * | 12/2001 | Hobson | D22/129 | |
| 6,655,074 B2 * | 12/2003 | Pentland | A01K 91/06 | 43/43.12 |
| 6,678,993 B1 * | 1/2004 | Long | A01K 91/065 | 43/42.39 |
| 7,444,778 B2 * | 11/2008 | Snowberger | A01K 91/08 | 43/43.13 |
| 8,413,367 B1 * | 4/2013 | Stirtz | A01K 91/065 | 43/43.13 |
| 2005/0252069 A1 * | 11/2005 | Pool | A01K 91/065 | 43/17.1 |
| 2018/0288989 A1 * | 10/2018 | Cooper | A01K 97/05 | |
| 2019/0254268 A1 * | 8/2019 | Parker | A01K 85/16 | |
| 2022/0030840 A1 * | 2/2022 | Payne | A01K 85/14 | |

* cited by examiner

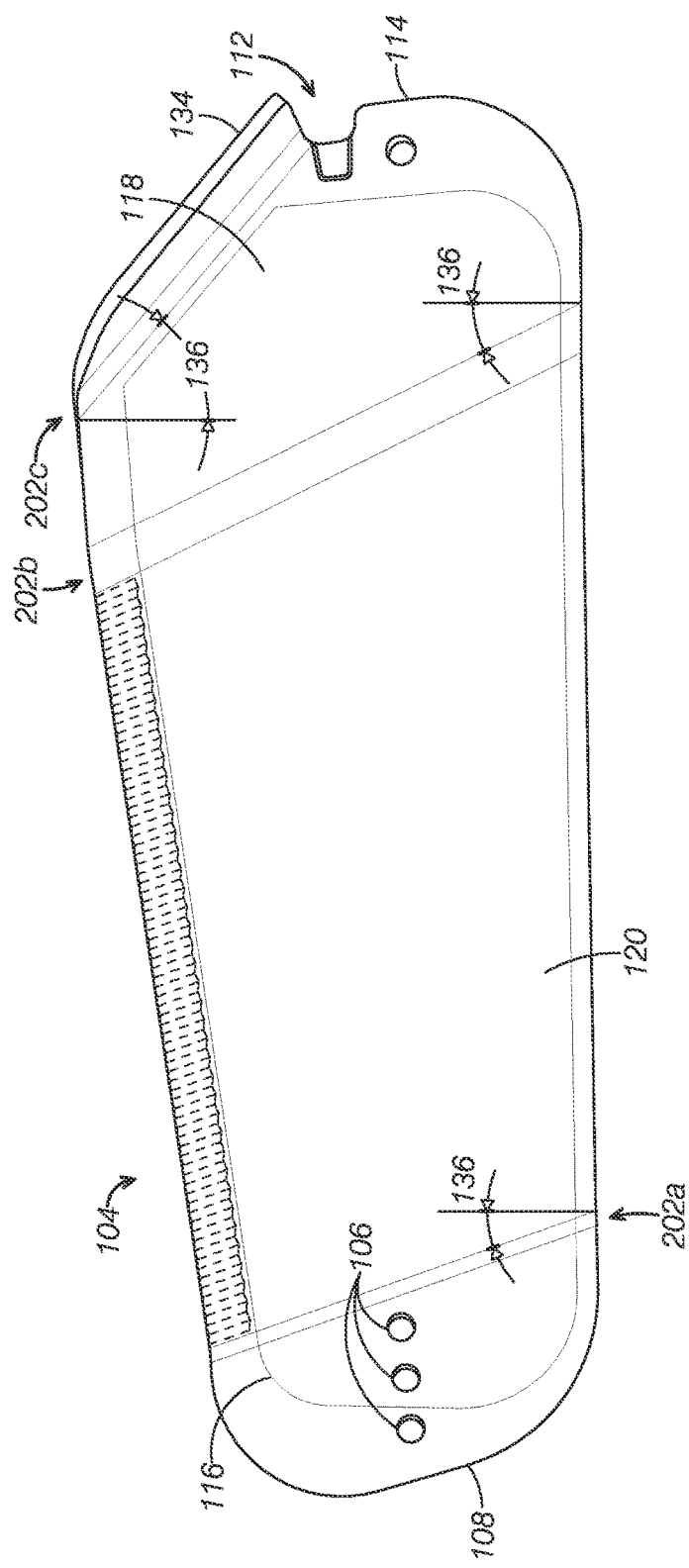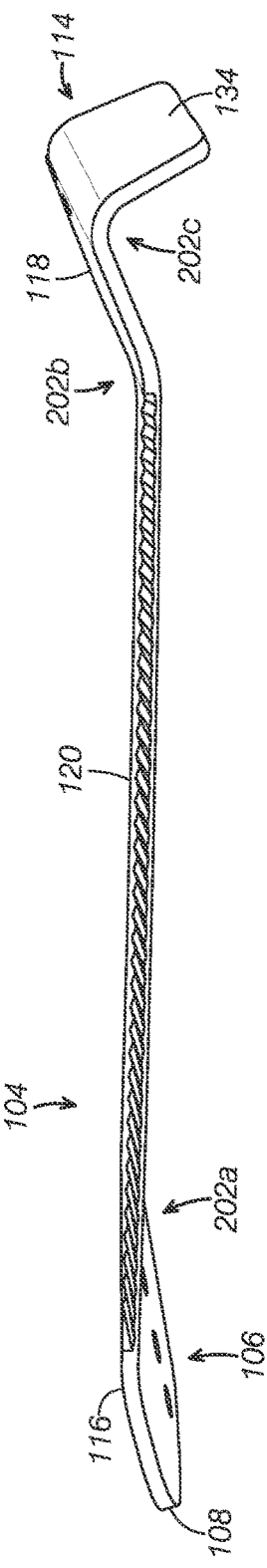

11,666,043 B2

APPARATUS AND METHOD FOR RELEASABLE FISHING LURE ATTRACTOR BLADE

PRIORITY CLAIM

This application claims priority to U.S. Application, Ser. No. 62/982,594, filed on Feb. 27, 1220, entitled Apparatus and Method For Releasable Fishing Lure Attractor Blade, which is hereby incorporated by reference for all purposes.

BACKGROUND OF THE INVENTION

In the arts of recreational fishing, and in particular with the use of attractor blades used to attract game fish to a fishing lure, a variety of different and complex attractor blades are known that are operable to entice game fish to strike a fisherman's lure (to bite on and/or at the lure with their mouths). Some advanced attractor blades are configured to release in response to the game fish becoming hooked on the fisherman's lure. Upon releasing, the attractor blade then is released to decrease the total drag on the fishing line, thereby enhancing the recreational effect for the fisherman and decreasing the likelihood of the fish being able to release itself from the fisherman's lure.

However, there is need in the arts to improve upon the motion characteristics exhibited by an attractor blade when in use (prior to and after the game fish becomes hooked on the fisherman's lure). Also, there is a need in the arts to improve upon the effectiveness of the attractor blade release mechanism.

SUMMARY OF THE INVENTION

Embodiments of the releasable attractor blade system provide a system and method for trolling an attractor blade. One embodiment has an attractor blade defined by an aperture proximate to an edge of a leading blade portion, defined by a release slot proximate to an edge of a trailing blade portion of the attractor blade. A release system has a retainer at the first end of a cord that passes through the aperture and is configured to be frictionally retained outside of the aperture; a release hook at the second end of a cord that is inserted into the release slot of the attractor blade to releasably secure the releasable attractor blade system to the attractor blade release system; and an elastic portion secured between the first and second cord ends, wherein the release system holds the attractor blade in position along a longitudinal axis during trolling so that the attractor blade attracts game fish.

BRIEF DESCRIPTION OF THE DRAWINGS

The components in the drawings are not necessarily to scale relative to each other. Like reference numerals designate corresponding parts throughout the several views.

FIG. 2 is a bottom view of an embodiment of the attractor blade.

FIG. 3 is a side view of the embodiment of the attractor blade.

DETAILED DESCRIPTION

Figure 1:
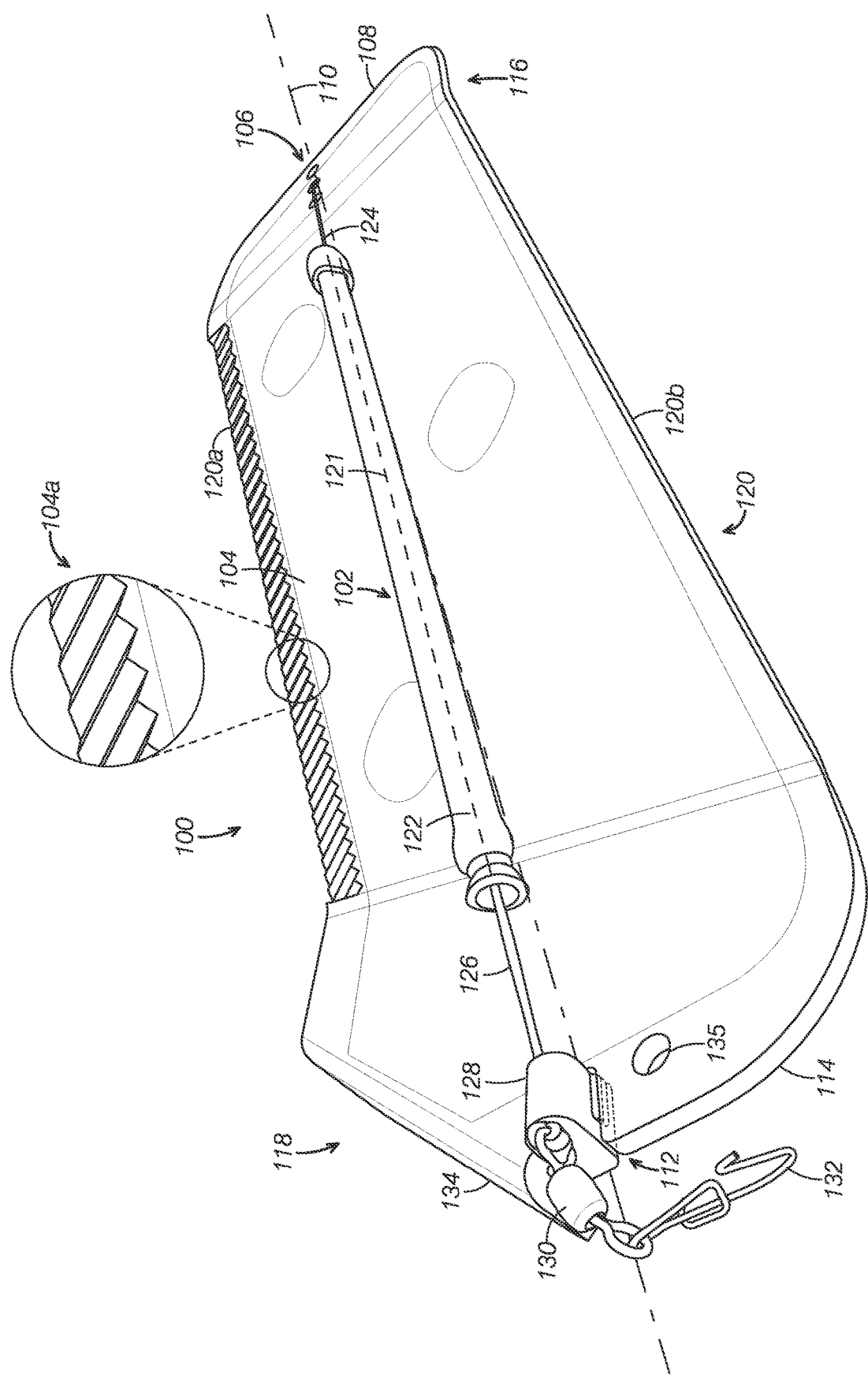
FIG. 1 is a block diagram of an embodiment of a releasable fish attractor blade system.

FIG. 1 is a perspective diagram of an embodiment of a releasable attractor blade system 100. Embodiments of the releasable attractor blade system 100 provides a system and method for releasing the releasable attractor blade system 100 in response to a game fish becoming hooked on a fishing lure that is trailing behind the releasable attractor blade system 100. The non-limiting term game fish includes food fish, forage fish, predatory fish, and recreational game fish, both saltwater and freshwater.

Typically, the releasable attractor blade system 100 and the following fishing lure or hook is used when the fisherman is using their water craft to tow the releasable attractor blade system 100 and the following fishing lure or hook while fishing for game fish. Here, the releasable attractor blade system 100 and the following fishing lure or hook are attached to a fishing line of a fishing pole, wherein the releasable attractor blade system 100 and the following fishing lure or hook are towed behind the water craft at some intended distance behind the watercraft and/or some depth below the water surface. This process of towing the releasable attractor blade system 100 and the following fishing lure or hook behind the water craft is interchangeably referred to herein as "trolling."

The releasable attractor blade system 100 will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various releasable attractor blade systems 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

FIG. 1 is a perspective diagram of an embodiment of a releasable attractor blade system 100. The releasable attractor blade system 100 comprises a release system 102 and an attractor blade 104. The attractor blade 104 and the release system 102 cooperatively work together to provide a game fish attractor that is used to attract game fish while trolling a lure or hook behind the attractor blade 104. The shape of the attractor blade 104 causes the attractor blade 104 to move about in the water during trolling. When a game fish becomes hooked on the lure or hook, tension caused by the struggling game fish causes the release system 102 to release. After release, the released attractor blade 104 is able to spin freely about the fishing line with significantly reduced drag, thereby allowing the fisherman to reel in the game fish with less resistance and with greater enjoyment.

The attractor blade 104 has a series of attachment apertures (holes) 106 at the leading end 108 of the attractor blade 104. The apertures 106 are proximate to and behind an edge of the leading end 108 of the attractor blade 104. The apertures 106 are aligned generally along the longitudinal axis 110 of the releasable attractor blade 104. At least one release slot 112 is disposed on the trailing end 114 of the attractor blade 104.

Preferably, the release slot 112 is recessed into the trailing end 114 of the attractor blade 104. The portion of the release slot 112 that receives the release hook 128, in some embodiments, is thinner that the thickness of the trailing end 114 of the attractor blade 14 (see also FIG. 5). That is, the thickness of the attractor blade 104 in the release slot 112 is thinner than a thickness of the attractor blade 104 proximate to the release slot 112. When the release hook 128 is placed into the release slot 112, the top of the release hook 128 is flush with, or is substantially flush with, the top surface and/or the bottom surface of the releasable attractor blade 104 to reduce drag (water friction). Also, the release slot 112 may be offset from the longitudinal axis 110 of the attractor blade 104 by a predefined distance to modify movement of the attractor blade 104 when trolling through the water.

The releasable attractor blade 104 is preferably a relatively rectangular elongated flat, planar unibody piece of metal, plastic or the like that has a leading blade portion 116 and a trailing blade portion 118, and a base portion 120 between the leading blade portion 116 and the trailing blade portion 118. The shape of the blade portions 116, 118 causes the releasable attractor blade 104 to rotate generally about the longitudinal axis 110 and/or move back and forth in a sidewise motion w % bile trolling. Preferably, the corners of each of the blade portions 116, 118 are rounded (though any shape may be used in the various embodiments). Blade portions 116, 118 can be any suitable length and its location is not limited to the upper and/or lower portions of the attractor blade 104.

The attractor blade 104 is designed to rotate in a predefined direction (clockwise or counterclockwise, depending upon the design of the attractor blade 104). When trolling, the leading side edge 120a of the body portion 120 cuts through the water as the attractor blade 104 rotates. In some embodiments, the leading side edge 120a of the base portion 120 is thinner than the trailing side 120b of the base portion 120 so as to reduce frictional water drag when trolling. In some embodiments, a portion of the leading side edge 120a of the body portion 120 may be beveled like a knife blade to further reduce drag. That is, the leading side edge 120a of the attractor blade 104 "cuts" through the water during rotation with significantly less frictional resistance than a legacy attractor blade. Further, characteristics of the bevel on the leading side edge 120a of the attractor blade 104 may affect other characteristics of the attractor blade 104. The design of the bevel may be used to control attributes of the rotational movement of the attractor blade 104 during trolling, such as the rotational speed (the number of revolutions per minute or the like), the rotational diameter (distance out from the centerline of the trolling fishing line), and/or the width and speed of any side-to-side motion that the releasable attractor blade 104 travels while trolling for game fish. The beveling may be on one side only on the leading side edge 120a of the body portion 120, or the beveling may be on both sides of the leading side edge 120a of the body portion 120.

If the attractor blade 104 is transparent with a decorative coating on the underside, topside and/or inside of the attractor blade 104, the bevel may optionally include small grooves 104a or the like that affect the light reflective properties of the attractor blade 104. The decorative coating may be made of metal, tape, film or another suitable reflective material. Here, the grooves 104a formed in the beveled edge may have a prismatic effect much like a cut diamond. As the attractor blade 104 rotates during trolling, the prismatic effect caused by the grooves 104a in the beveled leading side edge of the attractor blade 104 may increase visibility of the attractor blade 104 and become more attractive to game fish.

The attractor blade release system 102 comprises an elastic portion 122, a length of cord 121 having a first cord section 124 and a second cord section 126, and a release hook 128. The inside diameter of the tubular elastic portion 122 accommodates a predefined length of the cord 121 to internally reside within the interior of the elastic portion 122. The predefined length of the portion of the cord 121 within the tube is longer than a length of the elastic portion 122 tube. Alternatively, the cord 121 may reside outside of the elastic portion 122.

Both ends of the elastic portion 122 are secured to the cord 121 proximate to the ends of cord sections 124, 126 using a suitable fastener, such as a clip, adhesive, tie or the like. When the attractor blade release system 102 is secured to the attractor blade 104, a short length of cord remains folded or coiled within the interior of the elastic portion 122. After a game fish is hooked and the attractor blade 104 is released by the attractor blade release system 102, the elastic portion 122 extends (stretches) to the extent of the internally stored portion of the cord 121. Accordingly, the fully extended cord 121 bears all of the line tension between the user's fishing pole and the hooked game fish. Any suitable elastic material may be used for the hollow tubular elastic portion 122 in the various embodiments.

In an alternative embodiment, the attractor blade release system 102 comprises an elastic portion 122, a first length of cord 124, a second length of cord 126, and the release hook 128. Both ends of the elastic portion 122 are secured to a proximate end of the cords 124, 126 using a suitable fastener, such as a clip, adhesive, tie or the like. The distal end of the cord 126 is secured to the release hook 128. The distal end of the cord 126 is secured into one of the holes 106 in the attractor blade 104. Here, after release of the attractor blade 104, the cords 124, 126 and the elastic portion 122 cooperatively form a portion of the fishing line that is used to reel in the hooked game fish. In some embodiments, the elastic portion 122 may be a solid tubular section of elastic material. Any suitable elastic material may be used for the elastic portion 122 in the various embodiments.

An unexpected benefit provided by the stretched elastic portion 122 is that, at times, the game fish and/or fishing pole might move in a manner that creates less tension and slack in the fishing line. Such line slack creates a potential opportunity for the game fish to become un-hooked. However, if any slack occurs in the fishing line with embodiments of the releasable attractor blade system 100, the elastic portion 122 responsively retracts to pull the slack out of the fishing line, thereby keeping the hook secured in place in the mouth of the game fish.

The attractor blade release system 102 may be interchangeably referred to herein as an elastic lanyard. A barrel swivel 130 or the like may be optionally secured to the release hook 128 and/or the end of the cord section 126 to reduce line twisting during trolling. An optional hook snap 132 or the like may be secured to the barrel swivel 130 (or optionally secured to the release hook 128 and/or the end of the cord section 126 if the barrel swivel 130 is omitted) to provide an attachment point for a length of fishing line that is secured to the hook or lure.

Alternatively, the length of fishing line may be attached to aperture (hole) 135 and a selected one of the holes 106, optionally via another connector such as a swivel, knot, hook or the like, (thereby omitting the attractor blade release system 102). This practice enables use of other novel features of the attractor blade 104.

Some embodiments of the attractor blade 104 may include optional fins to further control motion of the attractor blade 104 during trolling. In an example embodiment, an optional fin 134 is located at the end of the trailing end 114 of the attractor blade 104. In other embodiments, a plurality of fins 134 may be used.

FIG. 2 is a bottom view of an embodiment of the attractor blade 104. FIG. 3 is a side view of an embodiment of the attractor blade 104.

The blade portions 116, 118 are formed by bending each of the blade portions 116, 118 at a predefined angle from the body portion 120 of the releasable attractor blade 104. Further, in some embodiments, the bends 202a, 202b, and/or 202c are placed at some predefined compound angle 136 (FIG. 2) relative to the edges of the body portion. Any suitable compound angle 136 may be used in the various embodiments. The compound angle 136 of the bends 202a-c, the degree of the compound angle bend on the bends 202a-c, and the size (surface area) of the blade portions 116, 118 define, in part, the travel characteristics of the attractor blade 104 during trolling. In an example embodiment, the compound angle 136 of bend 202a is approximately five to fifteen degrees. In an example embodiment, the compound angle 136 of bend 202b is approximately fifteen to thirty degrees. In an example embodiment, the angle 136 of bend 202c is approximately eighty to one hundred ten degrees. These compound angles 136 cooperatively define a compound angle.

In some embodiments, the plane of portion 116 is in an opposite direction than the plane of portion 118. Further, the two planes are, in some embodiments, not parallel with each other.

Travel characteristics include, but are not limited to, rotational speed (the number of revolutions per minute or the like), the rotational diameter (distance out from the centerline of the trolling fishing line), and/or the width and speed of any side-to-side motion that the releasable attractor blade 104 travels while trolling for game fish. Trolling speed (velocity of the water craft), and the speed and direction of any water current surrounding the releasable attractor blade system 100 if present, also effect the movement of the rotating releasable attractor blade 104. Further, the diameter of rotation of the leading end 108 of the attractor blade 104 may be less that the diameter of rotation of the trailing end 114. In some embodiments, the movement and/or rotation of the attractor blade 104 may cause an intermittent or erratic movement of the trailing lure and or hook to entice the game fish to strike.

Further, the plurality of holes 106 disposed along the longitudinal axis 110 in the leading blade portion 116 also affect movement of the rotating releasable attractor blade 104. Movement of the attractor blade 104 during trolling may be adjusted based on which one of the plurality of holes 106 are used for securing the attractor blade release system 102 to the releasable attractor blade 104. Any suitable number of holes 106 may be used in the various embodiments. Further, offsetting one or more of the holes 106 from the longitudinal axis 110 of the releasable attractor blade 104 may affect travel characteristics of the attractor blade 104 during trolling.

Further, when a plurality of release slots 112 are disposed in the trailing blade portion 118, securing the release system 102 to a particular one of the release slots 112 will also affect the travel characteristics of the rotating releasable attractor blade 104 based on which one of the plurality of release slots 112 (interchangeably referred to herein as a notch) are used for securing the attractor blade release system 102 to the releasable attractor blade 104. This allows water to push the leading end 108 of the attractor blade 104, thus providing the impetus to initiate movement and/or rotation of the attractor blade 104.

To enhance the attractiveness of the releasable attractor blade 104 to game fish, one or both of the outer surfaces of the releasable attractor blade 104 include a decorative portion, such as a film or the like, that is affixed to the surface(s) of the releasable attractor blade 104. Alternatively, or additionally, the decorative portion may be a film, paint, tape, etching, inscribing, foiling, or the like that is applied to one or more of the surfaces of, and/or internally within, the releasable attractor blade 104. Any suitable color, pattern, degree of reflectivity, transparency, glow, luminosity, and/or size may be used for the decorative portion of the releasable attractor blade 104 to enhance the attractiveness of the releasable attractor blade 104 to game fish. Any suitable material may be used for the decorative portion of the releasable attractor blade 104.

Figure 4:
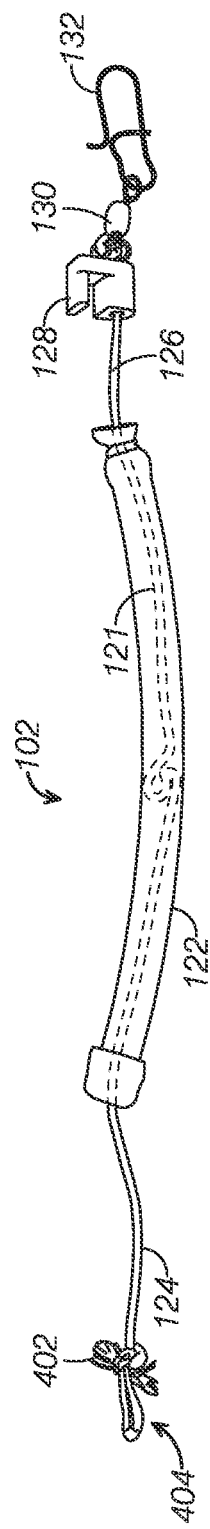
FIG. 4 is a side view of the release system.
Figure 5:
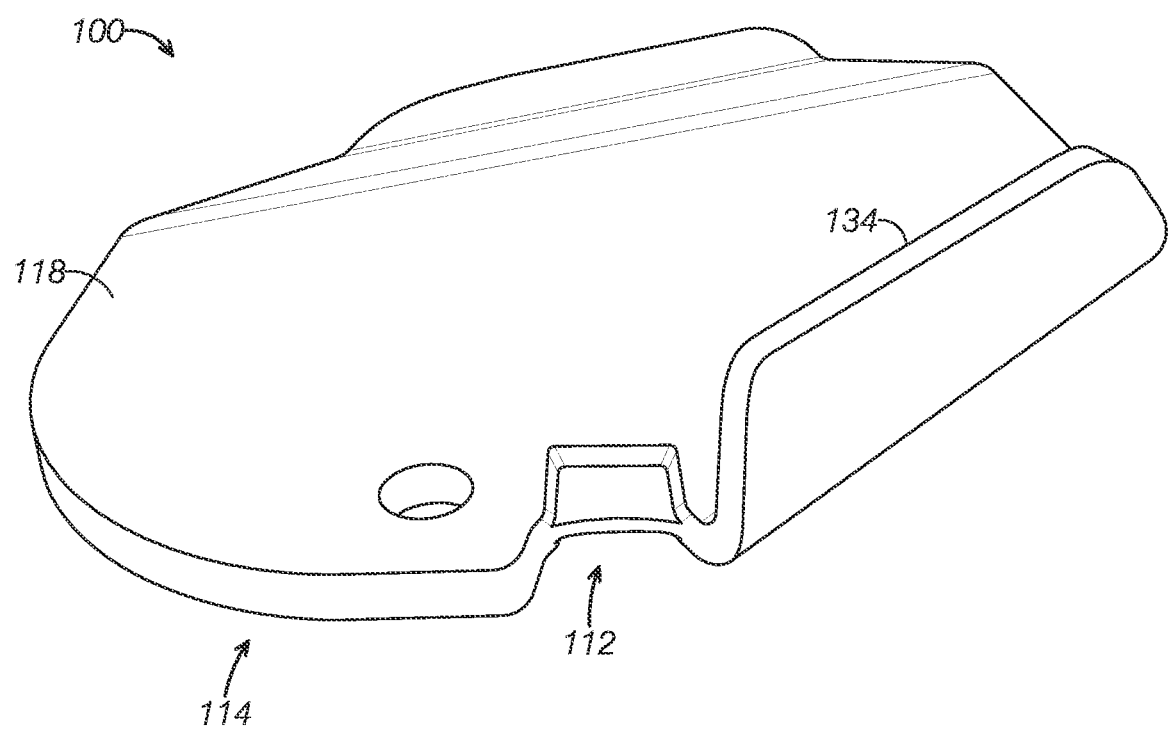
FIG. 5 is a closeup top perspective view of the bottom side of the trailing end of the attractor blade.
Figure 6:
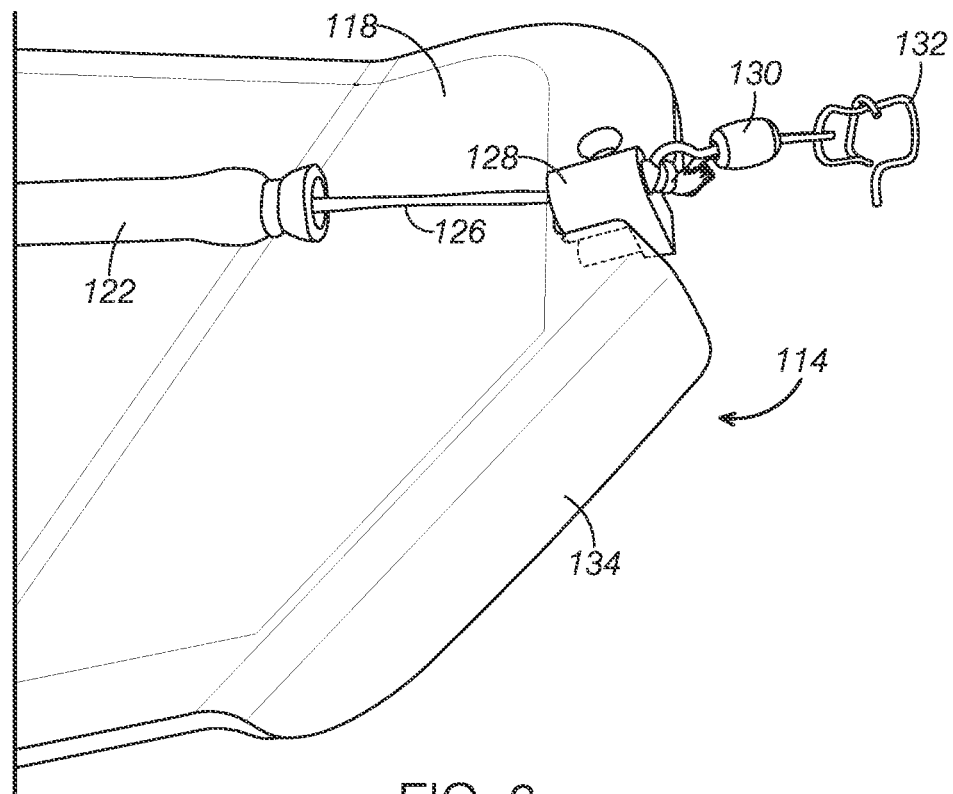
FIG. 6 is a closeup perspective view of the top side of the trailing end of the attractor blade.
Figure 7:
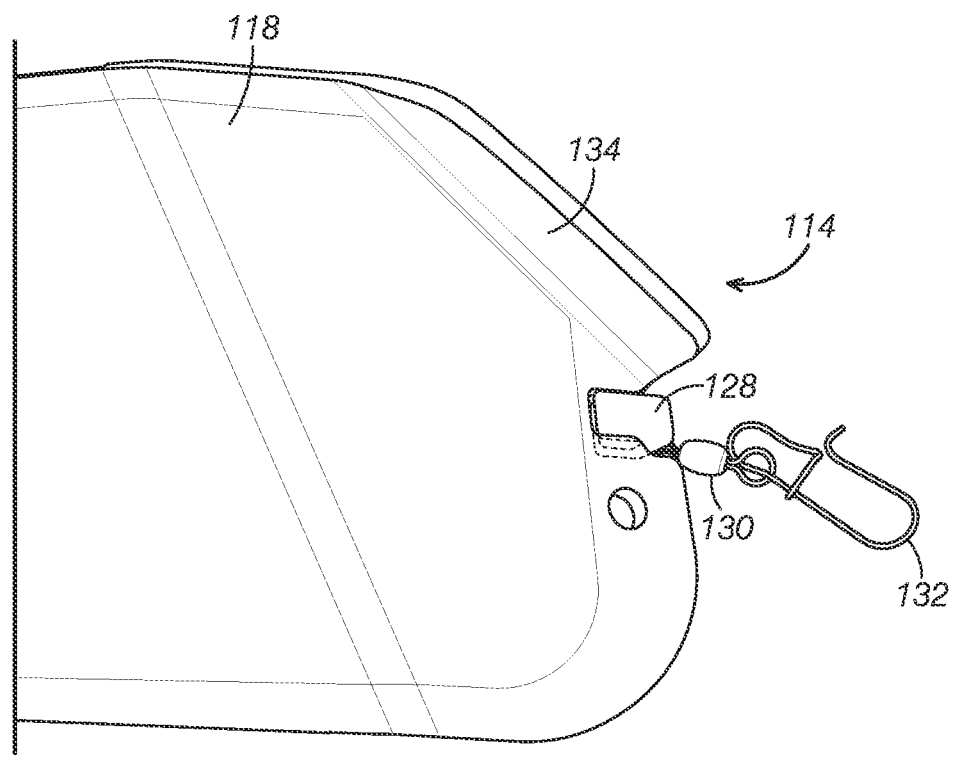
FIG. 7 is a closeup perspective view of the bottom side of the trailing end of the attractor blade.
Figure 8:
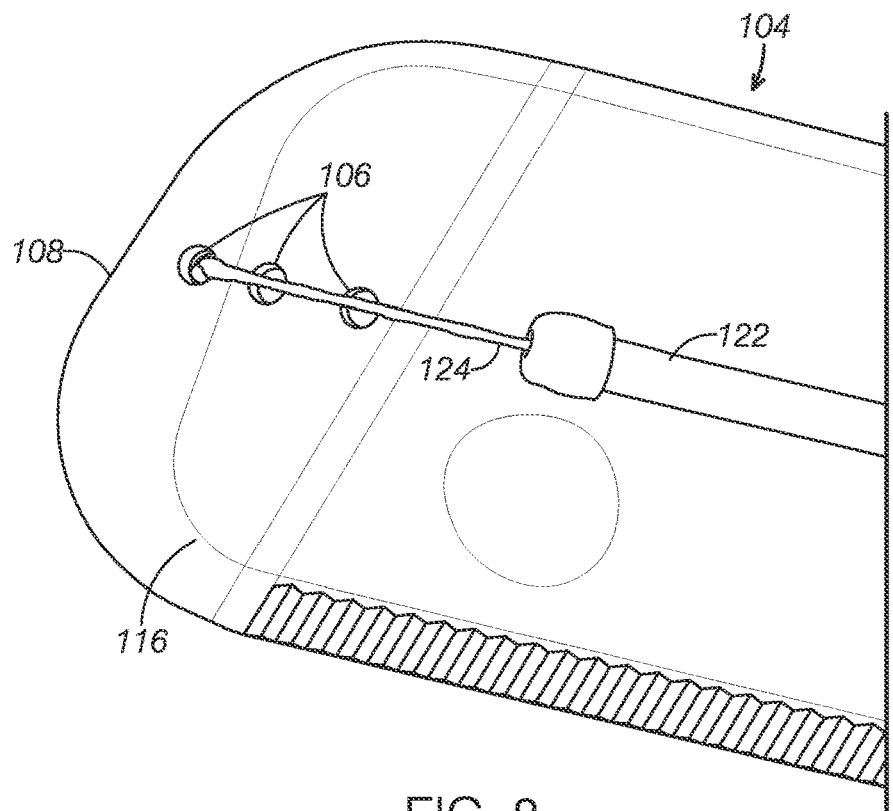
FIG. 8 is a closeup perspective view of the top side of the leading end of the attractor blade.
Figure 9:
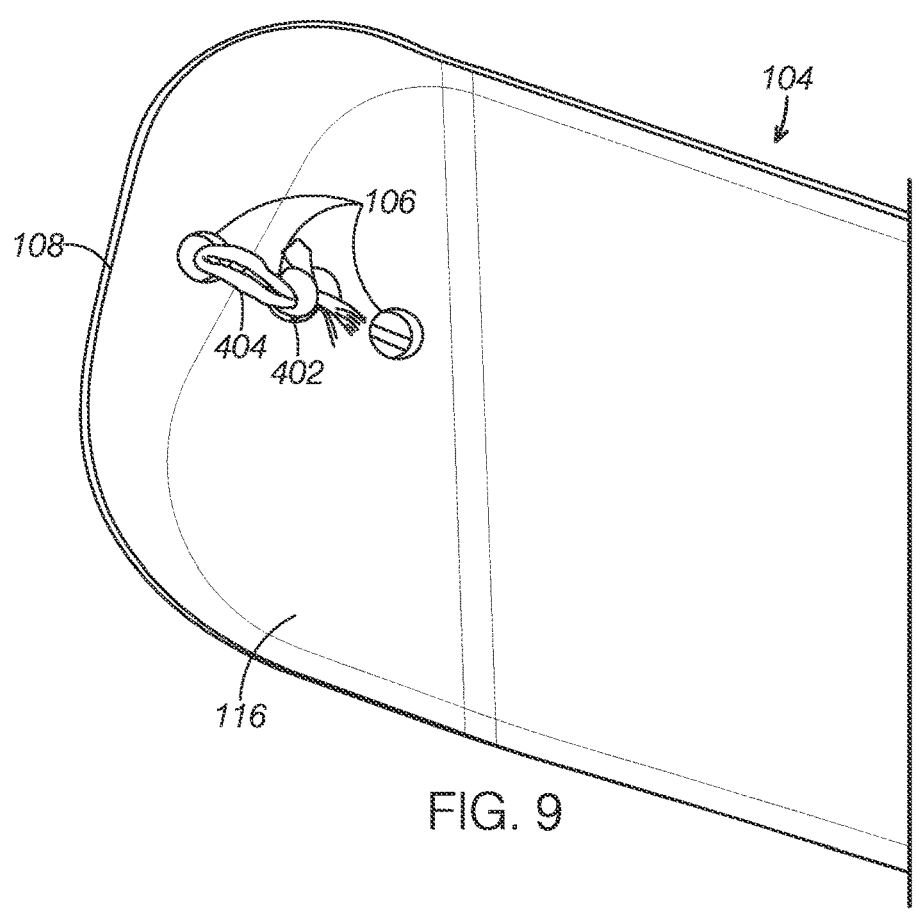
FIG. 9 is a closeup perspective view of the bottom side of the leading end of the attractor blade.

FIG. 4 is a side view of the release system 102. FIG. 5 is a closeup perspective view of the bottom side of the trailing end 114 of the attractor blade 104. FIG. 6 is a closeup perspective view of the top side of the trailing end 114 of the attractor blade 104. FIG. 7 is a closeup perspective view of the bottom side of the trailing end 114 of the attractor blade 104. FIG. 8 is a closeup perspective view of the top side of the leading end 108 of the attractor blade 104. FIG. 9 is a closeup perspective view of the bottom side of the leading end of the attractor blade.

An end of the first cord section 124 (proximal to an end of the elastic portion 122) of the of cord 121 is secured to a first end of the elastic portion 122. An end of the second cord section 126 (proximal to an opposing end of the elastic portion 122) of the of cord 121 is secured to the opposing second end of the elastic portion 122. Any suitable means may be used to secure the first end of the first cord section 124 of cord 121 to the first end of the elastic portion 122, such as a knot and bead, clamp, wire, adhesive, etc. Similarly, any suitable means may be used to secure the first end of the second cord section 126 of cord 121 to the opposing second end of the elastic portion 122. The length of cord 121 may be made of any suitable material, such as a natural fiber, metal, nylon, polyvinylidene fluoride (PVDF), fluorocarbon, polyethylene, Dacron, or UHMWPE. Any suitable elastic material may be used for the elastic portion 122 in the various embodiments.

In a preferred embodiment, the opposing second distal end of the first cord section 124 of cord 121 is tied into a retainer 402. In an example embodiment, the retainer 402 is a knot placed at the end of the cord section 124, thereby creating a loop 404. The size of the retainer 402, such as the example knot 402, is slightly larger than a size of the plurality of holes 106. In practice, the retainer (loop 404 and knot 402) can be forcibly pulled through a selected one of the plurality of holes 106 (see FIGS. 7 and 8). Since the size of the retainer 402 is slightly larger than the diameter of the selected hole 106, the retainer 402 does not pull back out of the hole 106 while trolling. In an alternative embodiment, a flexible polymer bead, or another apparatus forming the same function, or the like may be used instead of the knot 122 (or may be secured over the knot 402) to retain the end of the first section 124 of cord 121 in the selected hole 106. That is, after the retainer 402 has passed through the aperture 106, the retainer 402 is configured to be frictionally retained outside of the aperture 106.

A first end of the second cord section 126 of cord 121 (proximal to the elastic portion 122) is secured to an opposing second end of the elastic portion 122. An opposing end of the second cord section 126 is secured to a first end of the release hook 128. Any suitable means may be used to secure the first end of the second cord section 126 and the release hook 128 to the ends of the elastic portion 122, such as a knot and bead, clamp, wire, adhesive, etc. The second length of the cord section 126 may be made of the same material, or a different material, as the first cord section 124.

During use, after the first cord section 124 has been secured to a selected one of the plurality of holes 106, the elastic portion 122 is pulled back and elongated so that the release hook 128 is affixed into a selected one of the plurality of release slots 112. Here, the attractor blade release system 102 is stretched by the user, and the user inserts the release hook 128 into a selected one of the plurality of release slots 112.

The elastic portion 122 of the attractor blade release system 102 may be a length of stretchable material, such as a bungee cord, a tube made of rubber or a suitable elastic polymer, a solid length of rubber, or the like. The elastic portion 122 will stretch in response to the game fish becoming hooked on the lure to release the releasable attractor blade 104 (when the release hook 128 is pulled away from the slot 112), yet will remain in a retracted state to maintain tension on the attractor blade release system 102 so that the release hook 128 remains secured to the selected slot 112 in the releasable attractor blade 104 while trolling. That is, the elastic portion 122 stretches in response to tension applied to a fishing line such that the release hook 128 pulls out of the release slot 112 so that the attractor blade 104 is released by the attractor blade release system when a game fish strikes.

The total length of the attractor blade release system 102 corresponds to a length that is slightly less than the length between the holes 106 and the release slot 112 on the releasable attractor blade 104, and includes the cord 121 that is longer than the attractor blade 104 by some predefined length. Because of the elasticity of the elastic portion 122, the length of the attractor blade release system 102 is adjustable so that the attractor blade release system 102 may be used on a plurality of attractor blades 104 of different lengths. When the knot 402 is pulled through the selected one of the plurality of holes 106, the elastic portion 122 may then be stretched so that the release hook 128 can be inserted into a selected one of the plurality of release slots 112 (see FIGS. 6 and 7). Once the attractor blade release system 102 is secured to the releasable attractor blade 104 (by pulling the knot 402 through the selected one of the plurality of holes 106 and the release hook 128 is secured to a selected one of the plurality of release slots 112), the elastic portion 122 retracts to maintain tension of the release hook 128 in the selected slot 112. When a game fish becomes hooked on the fisherman's lure, the opposing tension applied on the fishing line attached to the lure transfers to the release hook 128, which then stretches the elastic portion 122 so that the release hook 128 releasably detaches from the slot 112. That is, the release hook 128 is pulled out of and away from the slot 112. The releasable attractor blade 104 is then released.

In design, any suitable length of the elastic portion 122 may be used in an embodiment so long as a designed amount of tension is maintained on the release hook 128 while trolling, and so that there is enough flexibility in the elastic portion 122 so as to be able to stretch to release the release hook 128 from the slot 112 when the game fish becomes hooked. In the illustrated example embodiments of FIGS. 1-3, the first cord section 124 of cord 121 is relatively long compared to the shorter second cord section 126 of cord 121. However, any suitable length may be used for the first cord section 124 of cord 121 and the second cord section 126 of cord 121.

The release hook 128 may be made of any suitable material that is sufficiently rigid so that when the release hook 128 is inserted into the selected release slot 112, the release hook 128 does not deform so as to cause an inadvertent release (where the release hook 128 otherwise pulls away from the release slot 112). The release hook 128 may be made of a plastic, polymer, wood, metal or other suitable material.

One skilled in the art appreciates that the end of the fishing line that extends back to the water craft is secured to the loop 404 of the attractor blade release system 102 using a suitable fastener, such as, but not limited to, a knot, a swivel, clasp or the like. The end of a line that extends back to the fishing lure is secured to the barrel swivel 130 (or the release hook 128). Accordingly, when trolling the fishing lines and the attractor blade release system 102 are substantially aligned together.

An unexpected result of providing the plurality of holes 106 is that depending upon which particular one of the plurality of holes 106 along the longitudinal axis 110 is used to secure the attractor blade release system 102 to the releasable attractor blade 104, the orientation of the releasable attractor blade 104 may be adjusted. Accordingly, the user is able to select a desired range of motion and/or a faster (or slower) motion of the releasable attractor blade 104 based on their trolling speed and/or based on water currents.

Selection of the hole 106 that is closest to the edge of the releasable attractor blade 104 will result in a relatively less amount of surface area of the leading blade portion 116 that is exposed to the passing water, thus resulting in a relatively less speed and/or amount of motion of the releasable attractor blade 104 while trolling. Such a selection of the hole 106 that is closest to the edge of the leading blade portion 116 may be suitable for trolling at a faster speed (since a faster trolling speed would induce a greater range of motion and/or a faster speed (revolutions per minute) of revolution motion of the releasable attractor blade 104) and/or when water currents are faster. It is an objective of embodiments of the attractor blade release system 102 and the attractor blade 104 to allow the user to select the motion of the attractor blade 104 regardless of the direction and/or speed of water current, and/or regardless of trolling speed.

On the other hand, selecting the hole 106 that is farthest from the edge of the leading blade portion 116 will create a relatively larger amount of surface area of the leading blade portion 116 that is exposed to the passing water, thus resulting in a relatively greater speed (revolutions per minute) and/or amount of motion, particularly at slower trolling speeds and/or slower water current, of the releasable attractor blade 104 while trolling. Such a selection of the hole 106 that is farthest from the edge of the leading blade portion 116 may be suitable for trolling at a slower speed (since a slower trolling speed would otherwise induce a lesser range of motion and/or a slower speed of revolution motion of the releasable attractor blade 104) and/or when water currents are relatively slower.

As noted above, in some embodiments, an optional fin 134 may be disposed on the releasable attractor blade 104 to further influence the motion of the releasable attractor blade 104 when trolling. For example, a non-limiting example fin 134 is illustrated on the trailing blade portion 118 of the releasable attractor blade 104. The non-limiting example fin 134 is formed by bending the attractor blade 104 by some predefined angle at bend 202c (FIG. 2). In this example embodiment, the releasable attractor blade 104 and fin 134 form a unibody structure. Any suitable number and/or size of fins 134 may be used in the various embodiments, and may be placed in any desired location and/or orientation on the releasable attractor blade 104. In a non-limiting example embodiment, the fin 134 extends beyond a plane defined by the body portion 120. The height of fin 134 may optionally taper away from the plane defined by the body portion 120 as the length of the fin extends from the edge 104 to the edge 120b, and optionally does not intersect with the plane defined by the body portion 120.

In the various embodiments, the fin 134 is at the end of the attractor blade 104. That is, there is no attractor blade material following the fin 134. A further unexpected benefit of this feature is a reduced weight and/or reduced drag on the attractor blade 104 creating easier movement of the attractor blade 104 through the water.

Figure 10:
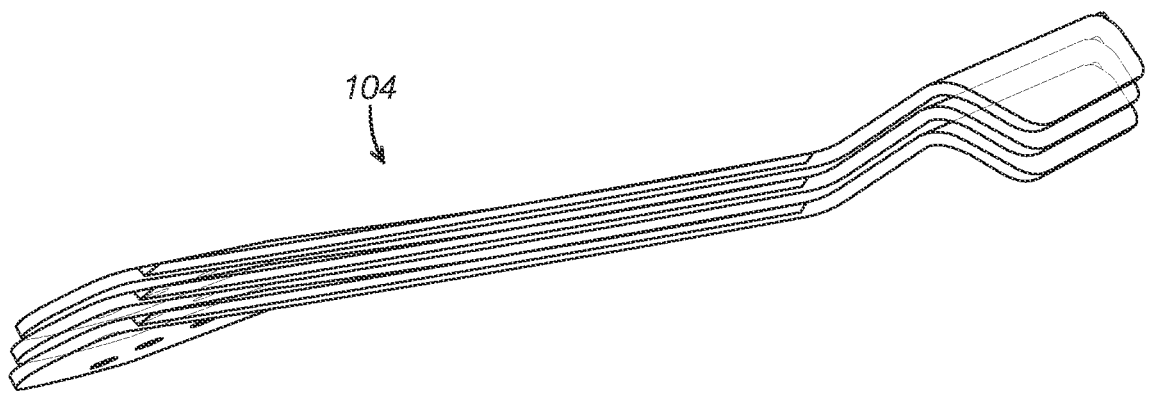
FIG. 10 illustrates a plurality of attractor blades stacked together.

FIG. 10 illustrates a plurality of attractor blades 104 stacked together. An unexpected advantage of forming the fin 134 by ending the attractor blade 104 at bend 202c is that a plurality of attractor blades 104 may be stacked together as illustrated in FIG. 10. One skilled in the art appreciates that the decorative patterns of a plurality of attractor blades 104 may be different to provide attraction under varying conditions, such as weather conditions, feeding habits of the game fish, and/or the particular type of game fish species. And, duplicate patterned attractor blades 104 may be used for multiple fishing lines and/or for replacement of a lost attractor blade 104. When a plurality of attractor blades 104 are being trolled in proximity to each other, the relatively larger size of the attractor blades 104 cooperatively mimic a school of feeding predatory fish (rather than a school of bait fish). The stacking of a plurality of attractor blades 104 reduces storage requirements, which may be limited on a fishing boat.

Figure 11:
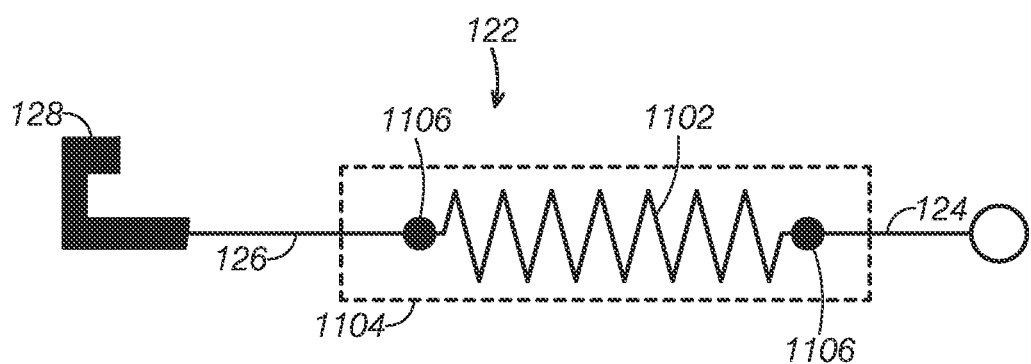
FIG. 11 is a block diagram of a spring that is used in an alternative embodiment of the attractor blade release system.

FIG. 11 is a block diagram of a spring 1102 that is used in an alternative embodiment of the attractor blade release system 102. Here, the elastic portion 122 of the attractor blade release system 102 is a spring 1102, typically made of spring steel or a material having similar elastic characteristics to cause similar functionality. When the spring 1102 is stretched when the attractor blade release system 102 is secured to the releasable attractor blade 104, the return force exerted by the spring 1102 maintains tension on the release hook 128 to retain the release hook 128 in the slot 112. In some embodiments, the spring 1102 may be enclosed in an enclosure 1104 or the like so that after the attractor blade release system 102 has been released from the releasable attractor blade 104, the spring stops 1106 prevent the spring 1102 from becoming overstretched beyond the spring's recovery limit when the fisherman is fighting with the game fish.

Another unexpected benefit is that the attractor blade 104, after a missed fish strike, encumbrance with seaweed or other debris, or other events that defeat motion may cause release of the attractor blade 104. Here, the user will observe a change in movement in the tip of their fishing pole after release of the attractor blade 104. Accordingly, the user may realize that the attractor blade 104 needs to be reset and/or the debris cleared.

It should be emphasized that the above-described embodiments of the releasable attractor blade system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A releasable attractor blade system, comprising:
   an attractor blade defined by a leading end, a trailing end, and a base portion,
      wherein the attractor blade is defined by an aperture proximate to an edge of the leading end of the attractor blade, and
      wherein the attractor blade is defined by a release slot proximate to an edge of the trailing end of the attractor blade;
   a release system, wherein the release system comprises:
      a length of cord defined by a first cord section and a second cord section;
      a retainer at the end of the cord, wherein the retainer is configured to pass through the aperture and is configured to be retained by the aperture;
      a release hook at the opposing end of the cord, wherein the release hook is configured to be is inserted into the release slot of the attractor blade, and wherein the release hook releasably secures the attractor blade to the release system; and
      an elastic portion defined by a first end and a second end, wherein the first end of the elastic portion is secured to the first cord section, and wherein the second end of the elastic portion is secured to the second cord section,
   wherein in response to securing the release hook into the release slot while the retainer is retained by the aperture, the elastic portion maintains tension between the release hook and the retainer so that the release hook, the retainer and the elastic portion cooperatively hold the attractor blade in position along a longitudinal axis during trolling so that the attractor blade attracts game fish.

2. The releasable attractor blade system of claim 1, wherein the elastic portion stretches in response to tension applied to a fishing line such that the release hook pulls out of the release slot so that the attractor blade is released by the release system.

3. The releasable attractor blade system of claim 1, wherein the attractor blade is further defined by a plurality of release slots disposed proximate to the edge of the trailing end of the attractor blade, wherein the release slot is a first one of the plurality of release slots aligned along a longitudinal axis.

4. The releasable attractor blade system of claim 1, wherein a thickness of the attractor blade in the release slot is thinner than a thickness of the attractor blade proximate to the release slot.

5. The releasable attractor blade system of claim 1, wherein the attractor blade is further defined by a fin disposed in the trailing end of the attractor blade to modify movement of the attractor blade when trolling through the water.

6. The releasable attractor blade system of claim 1, wherein the elastic portion is a tube made of rubber or a suitable elastic polymer, wherein a portion of the cord resides within an interior of the tube, wherein the portion of the cord within the tube has a predefined length, and wherein the predefined length of the portion of the cord within the tube is longer than a length of the tube.

7. The releasable attractor blade system of claim 1, wherein the elastic portion is a solid tube, wherein the first cord section is defined by a proximal end and a distal end, wherein the proximal end of the first cord section is secured to the first end of the elastic portion and the distal end of the first cord section has the retainer, wherein the second cord section is defined by a proximal end and a distal end, and wherein the proximal end of the second cord section is secured to the opposing second end of the elastic portion and the distal end of the second cord section is secured to the release hook.

8. The releasable attractor blade system of claim 1, wherein the elastic portion is a spring, and wherein the release system further comprises:
   an enclosure that encloses the spring;
   a first spring stop at a first end of the spring and coupled to an opposing end of the first cord section; and
   a second spring stop at an opposing second end of the spring and coupled to an opposing end of the second cord section,
   wherein after release of the attractor blade, the first spring stop and the second spring stop retain the spring within the enclosure.

9. The releasable attractor blade system of claim 1,
   wherein the attractor blade is further defined by a plurality of apertures disposed in and proximate to the leading end of the attractor blade along the longitudinal axis of the attractor blade,
   wherein the longitudinal axis extends from the leading end of the attractor blade to the trailing end of the attractor blade,
   wherein the aperture is a first aperture of the plurality of apertures that causes a first surface area of the leading edge of the attractor blade to induce a first speed of rotation at a speed of the trolling,
   wherein a second aperture of the plurality of apertures that causes a second surface area of the leading edge of the attractor blade that is different from the first surface area of the leading edge of the attractor blade, and
   wherein the second aperture induces a second speed of rotation that is different from the first speed of rotation at the speed of the trolling.

10. The releasable attractor blade system of claim 9,
    wherein the first aperture is closer to the leading end of the attractor blade than the second aperture, and
    wherein the second aperture induces the second speed of rotation that is greater than the first speed of rotation at the speed of the trolling.

11. The releasable attractor blade system of claim 1, wherein a leading side edge of the body portion is beveled to reduce frictional drag on the releasable attractor blade system when trolling through the water.

12. The releasable attractor blade system of claim 11, wherein the bevel includes a plurality of grooves configured to reflect light in a prismatic manner.

13. An attractor blade, comprising:
    a leading end with an aperture proximate to and behind an edge of the leading end of the attractor blade;
    a trailing end with a release slot proximate to an edge of the trailing end of the attractor blade; and
    a body portion between the leading end and the trailing end,
    wherein a retainer at an end of a cord of a release system is configured to pass through the aperture and is configured to be retained by the aperture,
    wherein a release hook at an opposing end of the cord of the release system is configured to be inserted into the release slot of the attractor blade, wherein the release hook releasably secures the releasable attractor blade system to the release system, and wherein an elastic portion defined by a first end and a second end, wherein the first end of the elastic portion is secured to a first cord section of the cord and wherein the second end of the elastic portion is secured to a second cord section of the cord, and wherein in response to securing the release hook into the release slot while the retainer is retained by the aperture, the elastic portion maintains tension between the release hook and the retainer so that the release hook, the retainer and the elastic portion cooperatively hold the attractor blade in position along a longitudinal axis during trolling so that the attractor blade attracts game fish.

14. The attractor blade of claim 13, wherein the elastic portion stretches in response to tension applied to a fishing line such that the release hook pulls out of the release slot so that the attractor blade is released by the release system.

15. The attractor blade of claim 13,
wherein the attractor blade is further defined by a plurality of apertures disposed in and proximate to the leading end of the attractor blade along the longitudinal axis of the attractor blade,
wherein the longitudinal axis extends from the leading end of the attractor blade to the trailing end of the attractor blade,
wherein the aperture is a first aperture of the plurality of apertures that causes a first surface area of the leading edge of the attractor blade to induce a first speed of rotation at a speed of the trolling,
wherein a second aperture of the plurality of apertures that causes a second surface area of the leading edge of the attractor blade that is different from the first area of the leading edge of the attractor blade, and
wherein the second aperture induces a second speed of rotation that is different from the first speed of rotation at the speed of the trolling.

16. The attractor blade of claim 13, wherein a thickness of the attractor blade in the release slot is thinner than a thickness of the attractor blade proximate to the release slot.

17. The attractor blade of claim 13, wherein a leading side edge of the body portion is beveled to reduce frictional drag on the releasable attractor blade system when trolling through the water.

18. An attractor blade, comprising:
a leading end with a first aperture proximate to an edge of the leading end of the attractor blade;
a trailing end with a second aperture proximate to an edge of the trailing end of the attractor blade; and
a body portion between the leading end and the trailing end,
wherein a leading side edge of the body portion is beveled to reduce frictional drag on the releasable attractor blade system when trolling through the water, wherein the bevel includes a plurality of grooves configured to reflect light in a prismatic manner, and wherein a retainer at an end of a cord of a release system is configured to pass through the first aperture and is configured to be frictionally retained outside of the aperture, wherein a release hook at an opposing end of the cord of the release system is configured to be inserted into a release slot of the attractor blade that is proximate to the edge of the trailing of the attractor blade, wherein the release hook releasably secures the releasable attractor blade system to the release system, and wherein an elastic portion secured to the opposing end of the cord and the opposing end of the cord of the release system holds the attractor blade in position along a longitudinal axis during trolling so that the attractor blade attracts game fish.

19. A releasable attractor blade system, comprising:
an attractor blade defined by a leading end, a trailing end, and a base portion,
wherein the attractor blade is defined by an aperture proximate to an edge of the leading end of the attractor blade, and
wherein the attractor blade is defined by a release slot proximate to an edge of the trailing end of the attractor blade;
a release system, wherein the release system comprises:
a length of cord;
a retainer at the end of the cord, wherein the retainer is configured to pass through the aperture and is configured to be retained by the aperture;
a release hook at the opposing end of the cord, wherein the release hook is configured to be is inserted into the release slot of the attractor blade, and wherein the release hook releasably secures the attractor blade to the release system; and
an elastic portion defined by a first end and a second end, wherein the first end of the elastic portion is secured to the first cord section, and wherein the second end of the elastic portion is secured to the second cord section,
wherein the release system holds the attractor blade in position along a longitudinal axis during trolling so that the attractor blade attracts game fish,
wherein a leading side edge of the body portion is beveled to reduce frictional drag on the releasable attractor blade system when trolling through the water, and
wherein the bevel includes a plurality of grooves configured to reflect light in a prismatic manner.

* * * * *